(12) United States Patent
White

(10) Patent No.: US 8,567,799 B2
(45) Date of Patent: Oct. 29, 2013

(54) WHEELED K-12 BOOK CARRIER AND ORGANIZER

(76) Inventor: Angélica Figueiredo White, Johns Creek, GA (US)

( * ) Notice: Subject to any disclaimer, the term of this patent is extended or adjusted under 35 U.S.C. 154(b) by 0 days.

(21) Appl. No.: 13/106,270

(22) Filed: May 12, 2011

(65) Prior Publication Data

US 2012/0200053 A1 Aug. 9, 2012

Related U.S. Application Data

(60) Provisional application No. 61/427,548, filed on Dec. 28, 2010.

(51) Int. Cl.
*B62B 3/00* (2006.01)

(52) U.S. Cl.
USPC .................................................. 280/47.371

(58) Field of Classification Search
USPC .......... 280/47.26, 47.371, 47.35, 651, 79.11, 280/79.3, 79.2, 79.7, 29; 190/18 R, 9; 312/249.11, 218, 209
See application file for complete search history.

(56) References Cited

U.S. PATENT DOCUMENTS

| | | | | | |
|---|---|---|---|---|---|
| 1,099,933 | A | * | 6/1914 | Pohrer | 280/47.17 |
| 1,760,854 | A | * | 5/1930 | Wright | 296/22 |
| D182,716 | S | * | 5/1958 | Ferguson | D34/21 |
| 2,847,057 | A | * | 8/1958 | Holcombe | 482/68 |
| 2,905,480 | A | * | 9/1959 | Giovannelli | 280/659 |
| D189,816 | S | * | 2/1961 | Rhoads | D34/20 |
| 3,149,726 | A | * | 9/1964 | Magers | 211/134 |
| 3,330,576 | A | * | 7/1967 | Willis | 280/79.3 |
| 3,388,943 | A | * | 6/1968 | Clement | 296/21 |
| 4,817,769 | A | * | 4/1989 | Saliba | 190/18 R |
| 4,821,903 | A | * | 4/1989 | Hayes | 280/47.26 |
| 4,998,743 | A | * | 3/1991 | Thielen | 280/47.26 |
| 5,244,220 | A | * | 9/1993 | Cortez | 280/47.26 |
| 5,301,443 | A | * | 4/1994 | Gori | 40/308 |
| 5,306,028 | A | * | 4/1994 | Pike et al. | 280/47.35 |
| 5,333,885 | A | * | 8/1994 | Pullman | 280/47.19 |
| 5,380,022 | A | * | 1/1995 | Dennis | 280/47.35 |
| 5,427,394 | A | * | 6/1995 | Lauto | 280/47.35 |
| 5,465,988 | A | * | 11/1995 | Dennis | 280/47.35 |
| 5,671,987 | A | * | 9/1997 | Hommes | 312/334.23 |
| 5,673,983 | A | * | 10/1997 | Carlson et al. | 312/218 |
| 5,836,455 | A | * | 11/1998 | Connor et al. | 206/757 |
| 5,848,798 | A | * | 12/1998 | Halvorson et al. | 280/47.35 |
| 5,876,047 | A | * | 3/1999 | Dennis | 280/47.35 |
| 5,893,572 | A | * | 4/1999 | Parks | 280/47.18 |
| D414,054 | S | * | 9/1999 | Hurd | D6/436 |
| 6,086,073 | A | * | 7/2000 | Tisbo et al. | 280/47.26 |
| 6,105,796 | A | * | 8/2000 | Buchanan et al. | 211/128.1 |
| 6,149,168 | A | * | 11/2000 | Pauser et al. | 280/47.371 |
| D450,485 | S | * | 11/2001 | Buchanan et al. | D6/474 |
| 6,520,514 | B2 | * | 2/2003 | Clegg | 280/47.26 |

(Continued)

*Primary Examiner* — Katy M Ebner
*Assistant Examiner* — Brodie Follman

(57) ABSTRACT

A wheeled K-12 Book Carrier Organizer is comprised of a main 4 side container with a plurality of subdivisions or folders connected to a sized base with swirl wheels. Built to the back of the main container is a multiple size handle with stop-brake capability. External to the main container are smaller holders and organizer containers with subdivisions for storing articles of different sizes and shapes. The main container subdivisions have a variety of front frames designs with windows to show information. The handle frame has a front window to display information and accessory hooks in each of the side of the frame to connect accessories to this carrier.

6 Claims, 6 Drawing Sheets

(56) References Cited

U.S. PATENT DOCUMENTS

| | | | |
|---|---|---|---|
| 6,695,325 B2* | 2/2004 | Carrillo | 280/47.34 |
| 6,843,488 B1* | 1/2005 | Tseng | 280/47.35 |
| 7,213,817 B2* | 5/2007 | Cheung | 280/42 |
| 7,328,905 B2* | 2/2008 | Guirlinger | 280/47.19 |
| 7,398,978 B2* | 7/2008 | Cheung | 280/42 |
| 7,464,945 B2* | 12/2008 | Humphries et al. | 280/47.26 |
| 7,467,801 B1* | 12/2008 | Garduno | 280/47.26 |
| 7,789,401 B2* | 9/2010 | Ambrefe, Jr. | 280/47.34 |
| 7,789,403 B2* | 9/2010 | Wilsher | 280/79.3 |
| D640,468 S * | 6/2011 | Libuda | D3/272 |
| 8,167,322 B2* | 5/2012 | Greene | 280/47.26 |
| 8,181,974 B1* | 5/2012 | Galvan et al. | 280/79.5 |
| 8,191,910 B2* | 6/2012 | Landau et al. | 280/47.35 |
| 8,292,310 B2* | 10/2012 | Turner | 280/47.35 |
| 2001/0015535 A1* | 8/2001 | Weck et al. | 280/47.315 |
| 2002/0096844 A1* | 7/2002 | Clegg | 280/47.17 |
| 2002/0125668 A1* | 9/2002 | Sims | 280/47.26 |
| 2003/0042695 A1* | 3/2003 | White | 280/47.26 |
| 2004/0066016 A1* | 4/2004 | Raikin | 280/219 |
| 2004/0119257 A1* | 6/2004 | Nelson et al. | 280/47.35 |
| 2005/0200090 A1* | 9/2005 | Ferraro et al. | 280/47.35 |
| 2005/0280228 A1* | 12/2005 | Fernandes et al. | 280/47.35 |
| 2006/0027985 A1* | 2/2006 | Miyoshi | 280/47.371 |
| 2006/0055135 A1* | 3/2006 | Tracewell et al. | 280/47.35 |
| 2006/0076744 A1* | 4/2006 | Martin | 280/47.35 |
| 2006/0097489 A1* | 5/2006 | Cheung | 280/651 |
| 2006/0175170 A1* | 8/2006 | Brown | 190/8 |
| 2006/0197297 A1* | 9/2006 | Humphries et al. | 280/47.26 |
| 2007/0069491 A1* | 3/2007 | Ferraro et al. | 280/79.11 |
| 2007/0090616 A1* | 4/2007 | Tompkins | 280/47.28 |
| 2007/0187913 A1* | 8/2007 | Cheung | 280/47.35 |
| 2008/0124434 A1* | 5/2008 | Hrudka | 426/233 |
| 2008/0238011 A1* | 10/2008 | Hammel et al. | 280/47.34 |
| 2009/0139913 A1* | 6/2009 | Pippin et al. | 209/584 |
| 2009/0200902 A1* | 8/2009 | McKay et al. | 312/249.12 |
| 2009/0295110 A1* | 12/2009 | Wilsher | 280/47.35 |
| 2012/0080857 A1* | 4/2012 | Smith | 280/29 |

* cited by examiner

Section A-A

WHEELED K-12 BOOK CARRIER AND ORGANIZER

CROSS REFERENCE TO RELATED APPLICATIONS

Provisional Patent Application No. 61/427,548
Filing Date: Dec. 28, 2010
Name of Applicant: Angelica Figueiredo White
Title of Invention: Wheeled K-12 Book Carrier Organizer

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to a mobile book/notebook/binder/paper/folder or any other similar classroom material carrier and organizer that allows K-12 students to have a portable book shelf and organizer within their reach and that fits within a classroom environment. It helps student's organizational skills by providing labeled subdivisions for different course materials. The additional label window located in the front of handle frame allows the display of class schedule. This invention's organizational capability gives students an alternative to the traditional desks that often work as a "black hole" for classroom material storage. Missing assignments, ragged books can be avoided by the usage of this invention. The existence of this invention also optimizes the student's workflow between classroom changes. While in elementary school kids have to carry their supply within their arm to another classroom and place them in a shared desk or floor for lack of space; this invention provides them with a portable personal carrier and organizer wherever they go in the school. In the middle and high school environment where a student locker is available, the race to lockers between classes, for material exchange, can be alleviated with the use of this invention and consequently allow more time for student readiness.

BRIEF SUMMARY OF THE INVENTION

The present invention provides a mobile book/notebook/class-material carrier and organizer that allows K-12 students to have a portable book shelf e organizer within their reach and that fits within a classroom environment. It helps student's organizational skills by providing labeled subdivisions for different course materials. The additional label window located in the front of handle frame allows the display of information such as class schedule.

A Wheeled K-12 Book Carrier Organizer is comprised of a main 4 side container with a plurality of subdivisions or folders connected to a sized base with swirl wheels. Built to the back of the main container is a multiple size handle with stop-brake capability. One side of main container holds a cup holder and the other side an organizer container with subdivisions for holding articles of different sizes and shapes. The main container subdivisions have a variety of front frames designs with windows to show information. The handle frame has a front window to display information and accessory hooks in each of the side of the frame to connect accessories to be developed for this carrier.

DETAILED DESCRIPTION OF THE INVENTION

Figure 1:
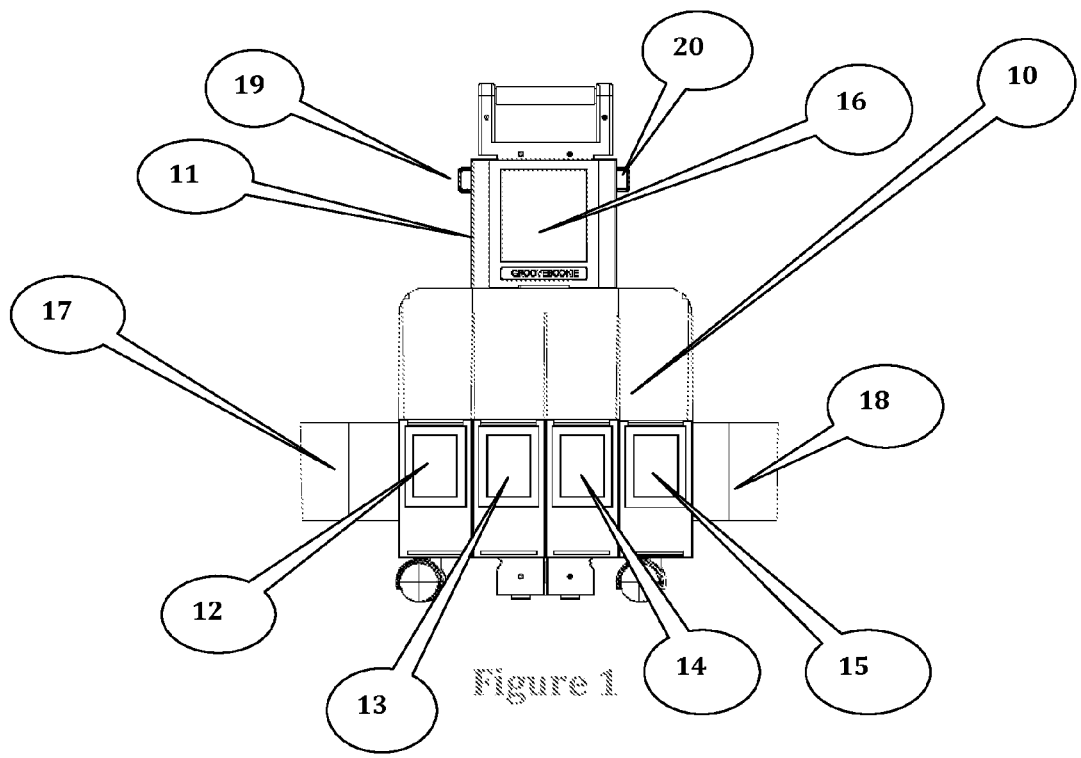
FIG. 1 shows the side perspective view of the Wheeled K-12 Book Carrier Organizer.

Referring to FIG. 1 illustrates a combination of portable and mobile K-12 book carrier with built-in organizer subdivisions designated at 10 and a multi position compacted handle at 11, augmented by design frames with informational windows displays at 12,13,14,15,16. The book carrier also has two external organizers, one in the shape of a cup holder as in 17 and the other an organizer container with subdivisions for holding articles of different sizes and shapes as in 18. The external organizers are available in the side or back of the carrier for convenience. In each side of the handle frame there is a hook for accessories as in 19 and 20. For purposes of this invention a Wheeled K-12 Book Carrier Organizer is defined broadly to include any type of wheeled book carrier organizer to he used by K-12 students in a school environment and that provides the functions claimed by this invention.

Figure 2:
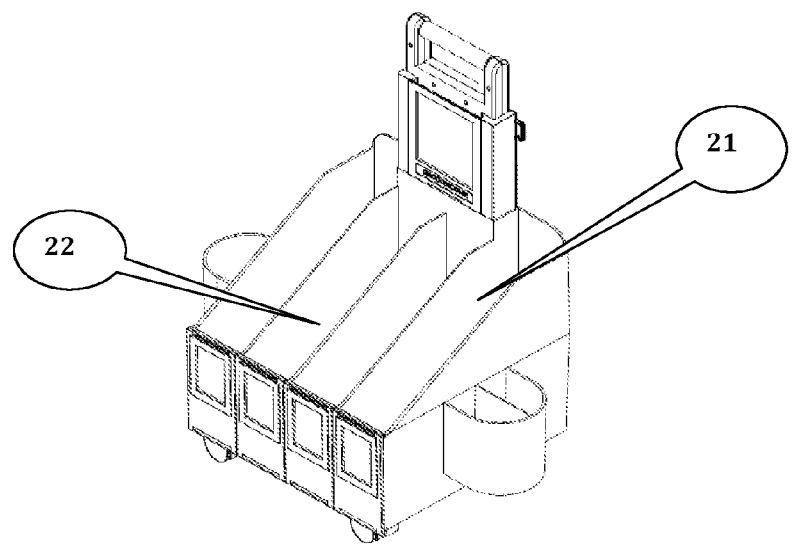
FIG. 2 shows the top perspective view of the Wheeled K-12 Book Carrier Organizer.

Referring to FIG. 2 shows a top perspective of this book carrier, which accommodates different depths to its main case subdivisions as in 21, 22.

Figure 3:
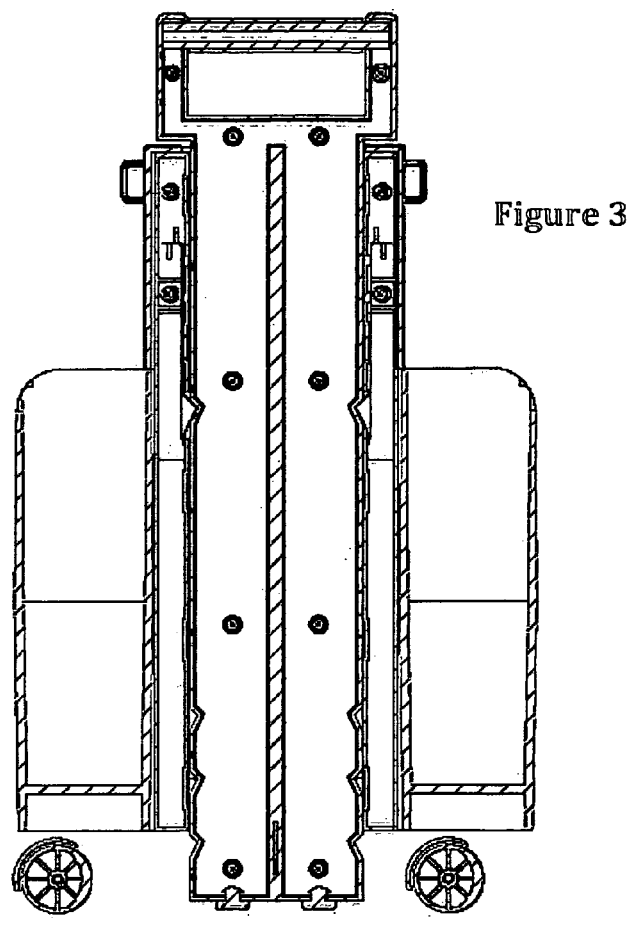
FIG. 3 shows the back view of the Wheeled K-12 Book Carrier Organizer with handle in the stop and brake position.

Referring to FIG. 3, shows the back of this book carrier with its multiple height handle at the stop and brake position as in 23.

Figure 4:
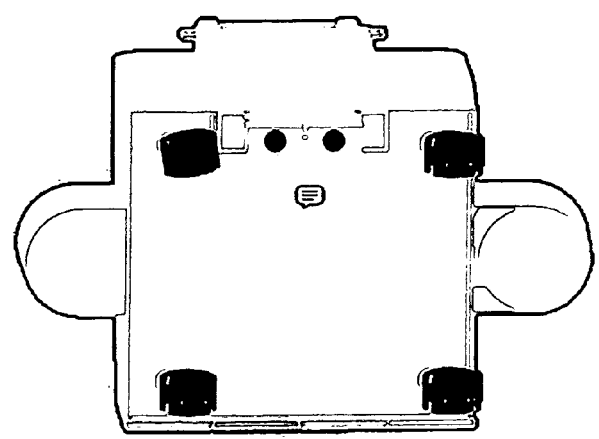
FIG. 4 shows hear axonometric views of the Wheeled K-12 Book Carrier with handle in the stop and brake position and parts of handle frame window to display information.

Referring to FIG. 4, shows the rear axonometric views of the Wheeled K-12 Book Carrier Organizer with handle in the stop and brake position and the swirl wheels attached to it.

Figure 5:
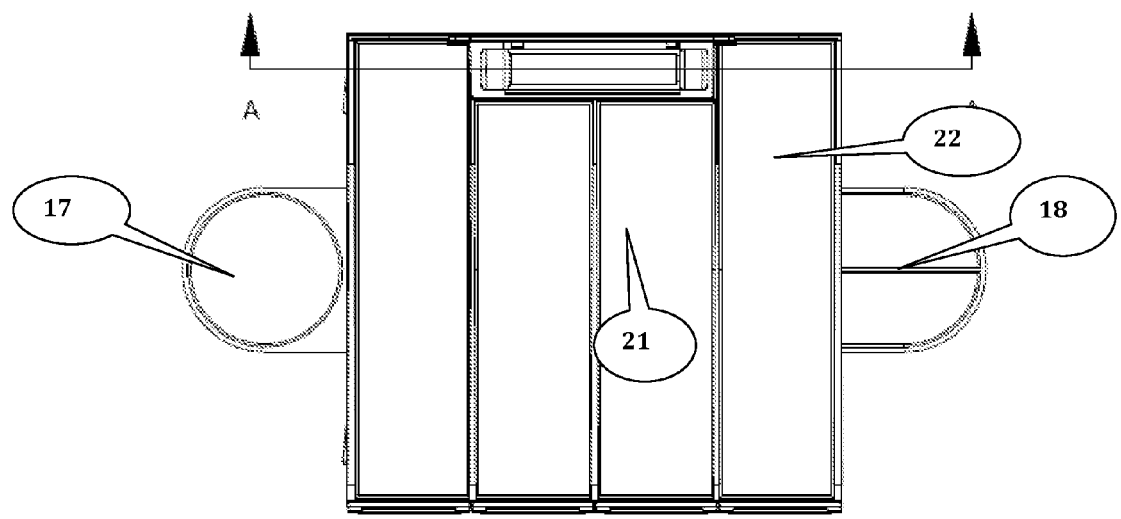
FIG. 5 shows the top views of the Wheeled K-12 Book Carrier Organizer.

Referring to FIG. 5 shows the top views of the Wheeled K-12 Book Carrier Organizer with is multi-sized subdivisions as in 21, 22, handle and exterior cup holder and organizer as in 17, 18

Figure 6:
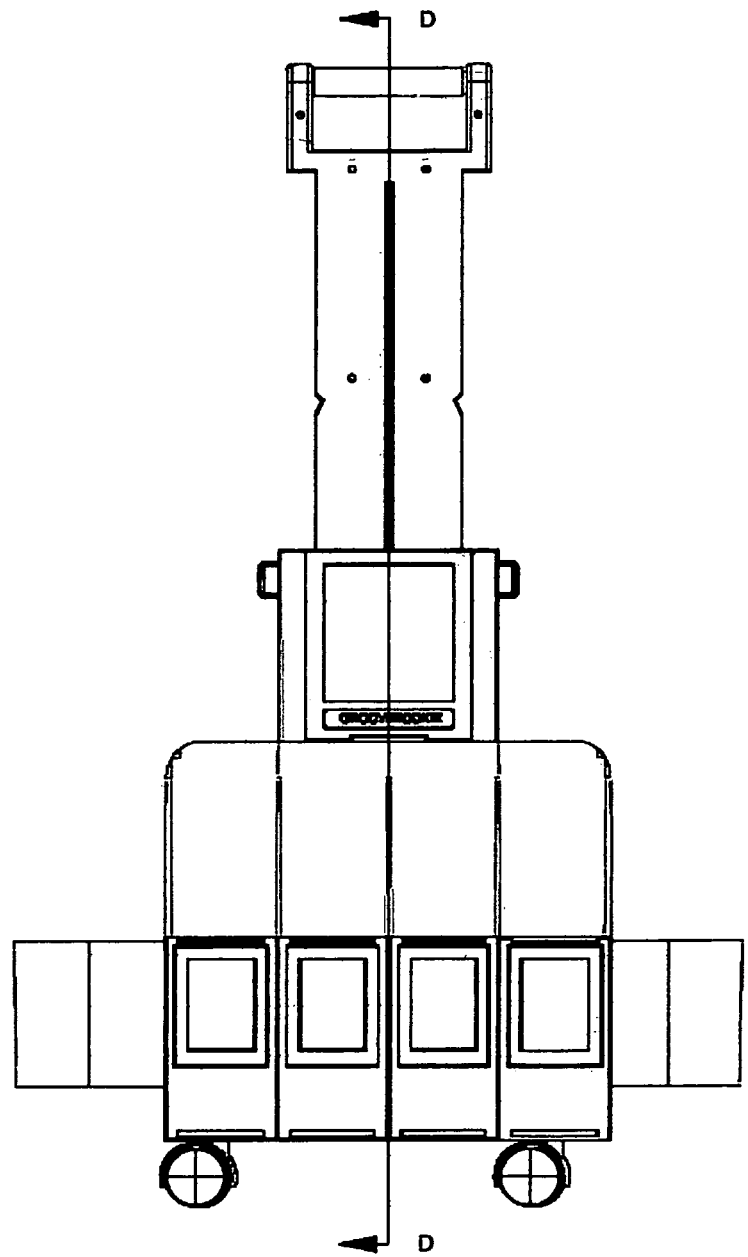
FIG. 6 shows the front views of the Wheeled K-12 Book Carrier Organizer with handle extended to its maximum position.

Referring to FIG. 6 shows the front views of the Wheeled K-12 Book Carrier Organizer with handle extended to its maximum position as in 24.

Figure 7:
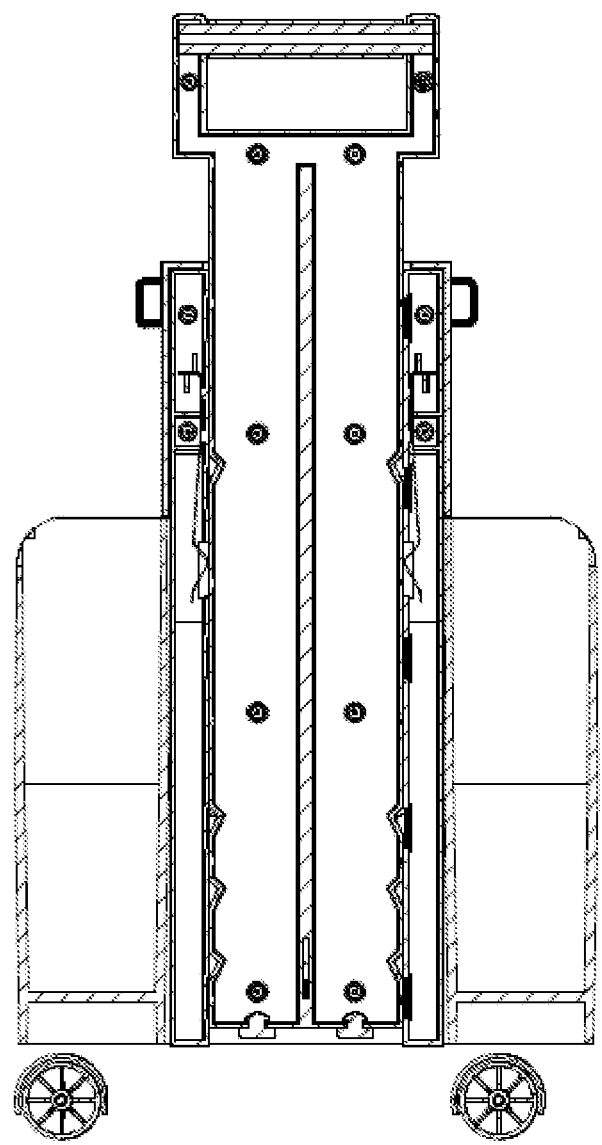
FIG. 7 shows the back view of the Wheeled K-12 Book Carrier Organizer with handle frame and handle on its lowest carrying position.

Referring to FIG. 7 shows the back view of the Wheeled K-12 Book Carrier Organizer with handle frame on its lowest carrying position.

Figure 8:
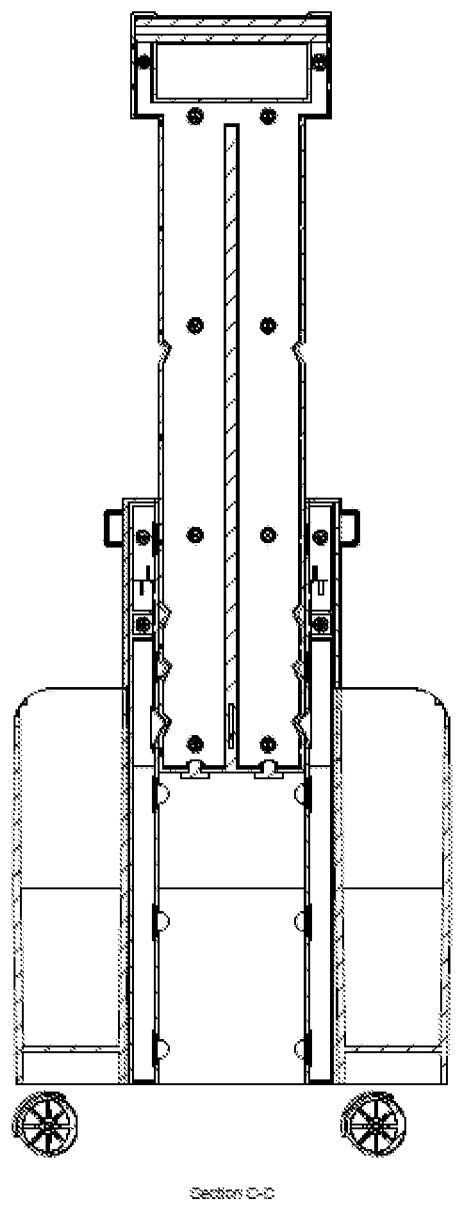
FIG. 8 shows the back view of the Wheeled K-12 Book Carrier Organizer with handle frame and handle on its highest carrying position.

Referring to FIG. 8 shows the back view of the Wheeled K-12 Book Carrier Organizer with handle frame on its highest carrying position.

I claim:

1. A wheeled K-12 book carrier organizer for transport, organization, and access to books and school supplies comprising:

A main container having a front side, a rear side, a left side, a right side, a base, wheels for traveling on a ground surface, and a plurality of subdivisions; and A handle frame formed in said rear side of said main container and extending upwardly from said rear side of the container, said handle frame accommodating an adjustable handle, said adjustable handle having at least one stop-brake position wherein said handle extends below said base and contacts said ground surface for braking said carrier and at least one position suitable for pulling or pushing of the carrier.

2. The carrier of claim 1, wherein said handle frame has at least one display window for displaying information.

3. The carrier of claim 1, wherein said handle frame has at least one accessory loop for holding accessories.

4. The carrier of claim 1, wherein at least one of said sides of said main container has at least one display window for displaying information.

5. The carrier of claim 1, wherein at least one of said sides of said main container has at least one cup holder attached thereto.

6. The carrier of claim 1, wherein at least one of said sides of said main container has at least one article holder attached thereto.

* * * * *